(12) United States Patent
Brelsford et al.

(10) Patent No.: US 7,698,251 B2
(45) Date of Patent: Apr. 13, 2010

(54) FAULT TOLERANT FACILITY FOR THE AGGREGATION OF DATA FROM MULTIPLE PROCESSING UNITS

(75) Inventors: David P. Brelsford, Hyde Park, NY (US); Richard J. Coppinger, Milton, NY (US); Alexander Druyan, Poughkeepsie, NY (US); Enci Zhong, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/412,757

(22) Filed: Apr. 27, 2006

(65) Prior Publication Data
US 2007/0255682 A1   Nov. 1, 2007

(51) Int. Cl.
*G06F 17/30* (2006.01)
(52) U.S. Cl. ............... 707/2; 707/100; 707/200; 707/201; 707/202; 707/203; 709/209
(58) Field of Classification Search ............... None
See application file for complete search history.

(56) References Cited

U.S. PATENT DOCUMENTS

| | | | |
|---|---|---|---|
| 6,314,460 B1 * | 11/2001 | Knight et al. ............... 709/220 |
| 6,499,063 B1 | 12/2002 | Chessell et al. ............... 709/315 |
| 6,594,786 B1 * | 7/2003 | Connelly et al. ............... 714/50 |
| 6,959,320 B2 | 10/2005 | Shah et al. ............... 709/203 |
| 7,139,784 B2 * | 11/2006 | Knobe et al. ............... 707/206 |
| 7,206,849 B1 * | 4/2007 | Gernert et al. ............... 709/229 |
| 2002/0052947 A1 * | 5/2002 | Duimovich et al. ............ 709/224 |
| 2004/0249904 A1 * | 12/2004 | Moore et al. ............... 709/216 |
| 2005/0021306 A1 * | 1/2005 | Garcea et al. ............... 702/186 |

OTHER PUBLICATIONS

"The ganglia distributed monitoring system: design, implementation, and experience," by Massie, Matthew et al, pp. 817-838, published Jun. 15, 2004, El Sevier Parallel Computing.*

"Coding for high availability of a distributed-parallel storage system," Malluhi et al., Dept. of Comput. Sci; Jacksonville State Univ.; AL; USA; IEEE Transactions on Parallel and Distributed Systems, vol. 9, No. 12, pp. 1237-1252, Dec. 1998 (Abstract Only).

(Continued)

*Primary Examiner*—Neveen Abel Jalil
*Assistant Examiner*—Farhan M Syed
(74) *Attorney, Agent, or Firm*—Mitch Harris, Atty at Law, LLC; Andrew M. Harris; Matthew W. Baca (57) ABSTRACT

A fault tolerant capability for the reliable collection and aggregation of disparate data from multiple processing units. Data of a processing unit is collected and locally aggregated at that processing unit. The locally aggregated data is stored in a local database, and periodically forwarded to a central manager. In response to receiving the data, the central manager determines whether the data should be included in a total aggregate of data for the processing environment.

9 Claims, 6 Drawing Sheets

OTHER PUBLICATIONS

"Distributed File Systems: Concepts and Examples," Levy et al., ACM Computing Surveys, vol. 22, No. 4, Dec. 1990, pp. 321-374.
"Run-Time Support for Distributed Sharing in Safe Languages," Hu et al., ACM Transactions on Computer Systems, vol. 21, No. 1, Feb. 2003, pp. 1-35.
"Analyzing Peer-To-Peer Traffic Across Large Networks," Sen et al., IEEE/ACM Transactions on Networking, vol. 12, No. 2, Apr. 2004, pp. 219-232.
"Reconciliation of Independently Updated Distributed Data," Lucash et al., U.S. Appl. No. 11/272,221, filed Nov. 10, 2005.

* cited by examiner fig. 1 fig. 2 fig. 3 fig. 4 fig. 5 fig. 6

FAULT TOLERANT FACILITY FOR THE AGGREGATION OF DATA FROM MULTIPLE PROCESSING UNITS

CROSS-REFERENCE TO RELATED APPLICATIONS

This application contains subject matter which is related to the subject matter of the following application, which is assigned to the same assignee as this application. The below listed application is hereby incorporated herein by reference in its entirety:

"FAIR SHARE SCHEDULING BASED ON AN INDIVIDUAL USER'S RESOURCE USAGE AND THE TRACKING OF THAT USAGE," Enci Zhong, Ser. No. 11/412,758, filed concurrently herewith, and published as U.S. Patent Application US 20070256077.

TECHNICAL FIELD

This invention relates, in general, to data management in a distributed processing environment, and in particular, to facilitating the collection and aggregation of data from multiple processing units of the distributed processing environment in a fault tolerant manner.

BACKGROUND OF THE INVENTION

In a distributed processing environment, such as a clustered environment, data is collected and aggregated from multiple processing units of the environment. This aggregated data can be employed in many tasks, including, but not limited to, workload management within the processing environment.

Previously, in order to collect this data, data was sent by a processing unit to a central manager of the environment. The central manager then had the responsibility of aggregating the data. However, the communications medium between the processing unit and the central manager is unreliable, and therefore, data was lost and/or repeatedly sent. This led to inaccuracies in the data aggregation.

SUMMARY OF THE INVENTION

Based on the foregoing, a need exists for an enhanced facility for the collection and aggregation of data from multiple processing units of an environment. In particular, a need exists for a fault tolerant facility for the collection and aggregation of data, in which lost and duplicate data is tolerated by the central manager.

The shortcomings of the prior art are overcome and additional advantages are provided through the provision of a method of facilitating data aggregation in a multiprocessing environment. The method includes, for instance, tracking, by a central manager of the processing environment, locally aggregated data of each processing unit of multiple processing units of a plurality of processing units of the processing environment, wherein locally aggregated data of a processing unit is data related to that processing unit, and wherein the tracking ensures duplicate locally aggregated data and outdated locally aggregated data are discarded; and aggregating, by the central manager, the locally aggregated data of the multiple processing units to obtain total aggregated data for the multiprocessing environment.

In a further embodiment, a method of aggregating data in a multiprocessing environment is provided. The method includes, for instance, locally aggregating data by each processing unit of multiple processing units of a plurality of processing units of the multiprocessing environment, the locally aggregating ensuring that no data to be aggregated is lost, and wherein the locally aggregated data of a processing unit includes data related to that processing unit; forwarding, by each processing unit of the multiple processing units, its locally aggregated data to a central manager via one or more unreliable connections, wherein the forwarding tolerates zero or more failed attempts to forward; tracking, by the central manager, the locally aggregated data of each processing unit, wherein the tracking ensures duplicate locally aggregated data and outdated locally aggregated data are discarded; and aggregating, by the central manager, the locally aggregated data of the multiple processing units to obtain reliable total aggregated data for the multiprocessing environment.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a fault tolerant capability is provided for the reliable collection and aggregation of disparate data from multiple processing units. Data of a processing unit is collected and locally aggregated at that processing unit. The locally aggregated data is stored and periodically forwarded to a central manager. In response to receiving the data, the central manager determines whether the data should be included in a total aggregate of data for the processing environment. If it is determined that the data should be included, the central manager adds the data to the total aggregate. The total aggregate can then be used by the central manager in a number of situations, including, for instance, in fair share scheduling.

One embodiment of a processing environment incorporating and using one or more aspects of the present invention is described with reference to FIG. 1. In one example, the processing environment is a distributed processing environment, such as a clustered environment, in which resources of the environment are shared to perform system tasks. Although a clustered environment is described herein as incorporating and using one or more aspects of the present invention, other types of environments, including non-clustered environments, may benefit from one or more aspects of the present invention.

Figure 1:
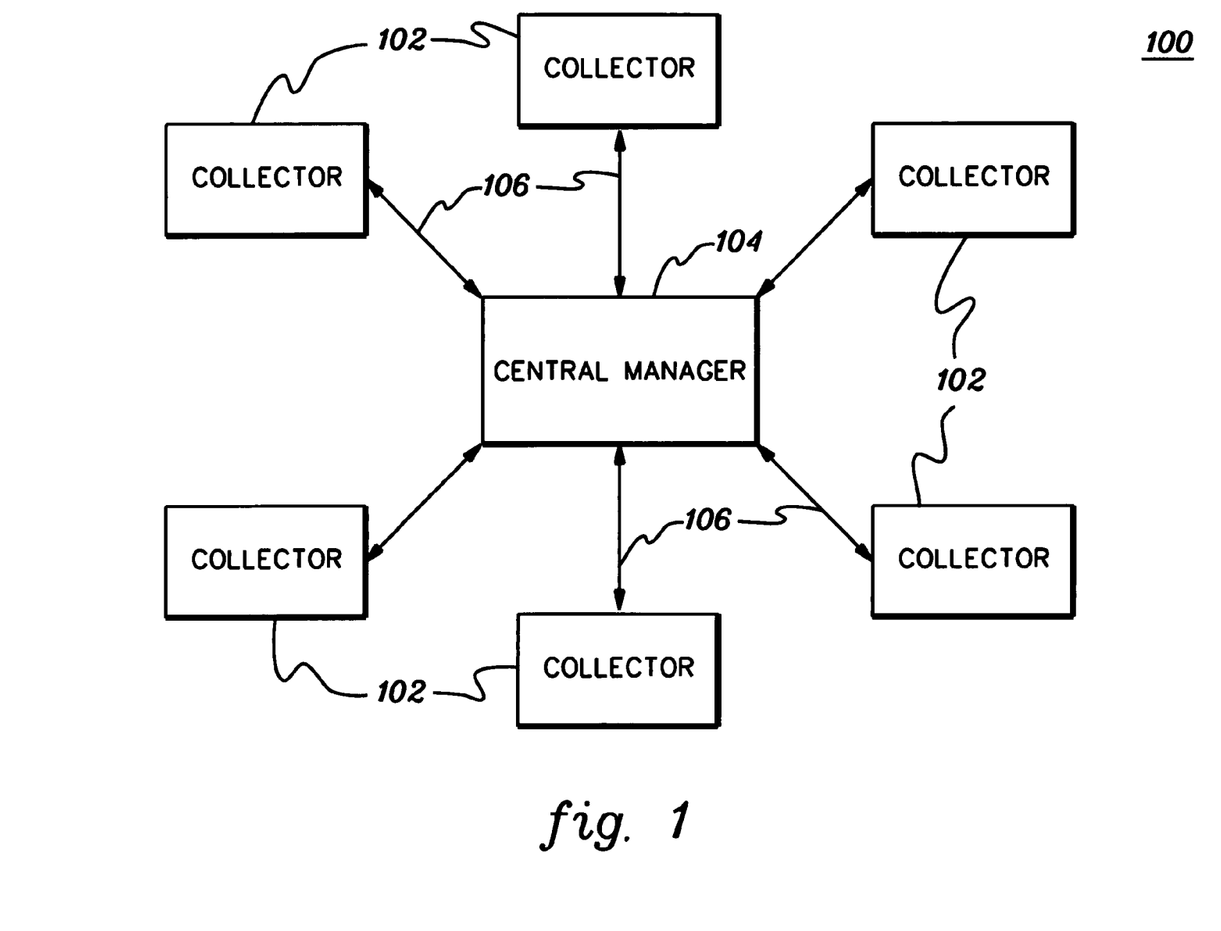
FIG. 1 depicts one embodiment of a processing environment incorporating and using one or more aspects of the present invention.

FIG. 1 depicts a clustered environment 100 including, for instance, a plurality of processing units 102 coupled to at least one other processing unit 104 via one or more connections 106. Connections 106 are, for instance, unreliable connections and include, but are not limited to, wire connections, wireless connections or any type of network connection, such as a local area network (LAN), a wide area network (WAN), a token ring, an Ethernet connection, etc. Optionally, a processing unit 102 is also coupled to one or more other processing units 102 via one or more connections.

In one example, the processing units include, for instance, personal computers, laptops, workstations, mainframes, mini computers or any other type of processing units. As one particular example, each processing unit is a PSERIES server offered by International Business Machines Corporation, Armonk, N.Y. (PSERIES is a registered trademark of International Business Machines Corporation, Armonk, N.Y.) Each processing unit may or may not be the same type of processing unit as another unit. In one example, each processing unit executes an operating system, such as Linux, or AIX® offered by International Business Machines Corporation. ("AIX" is a registered trademark of International Business Machines Corporation, Armonk, N.Y.) The operating system of one processing unit may be the same or different from another processing unit. Further, in other examples, one or more of the processing units may not include an operating system.

In accordance with an aspect of the present invention, each processing unit 102 (or a subset thereof) is a collector of data, and therefore, is referred to herein as a collector or a collector machine. For instance, as jobs executing on the processing unit terminate or at periodic intervals, a collector collects resource usage information relating to the jobs being processed on that processing unit. The information being collected by the collectors is then forwarded to processing unit 104, which is referred to herein as a central manager. The central manager is responsible for globally managing various tasks of the processing environment. For instance, the central manager includes a job scheduler responsible for fair share scheduling within the environment and uses the collected information in fair share scheduling. In particular, in this example, each collector collects data that contributes to a composite aggregate of data used by the central manager (e.g., the job scheduler) in scheduling jobs to be executed.

Figure 2:
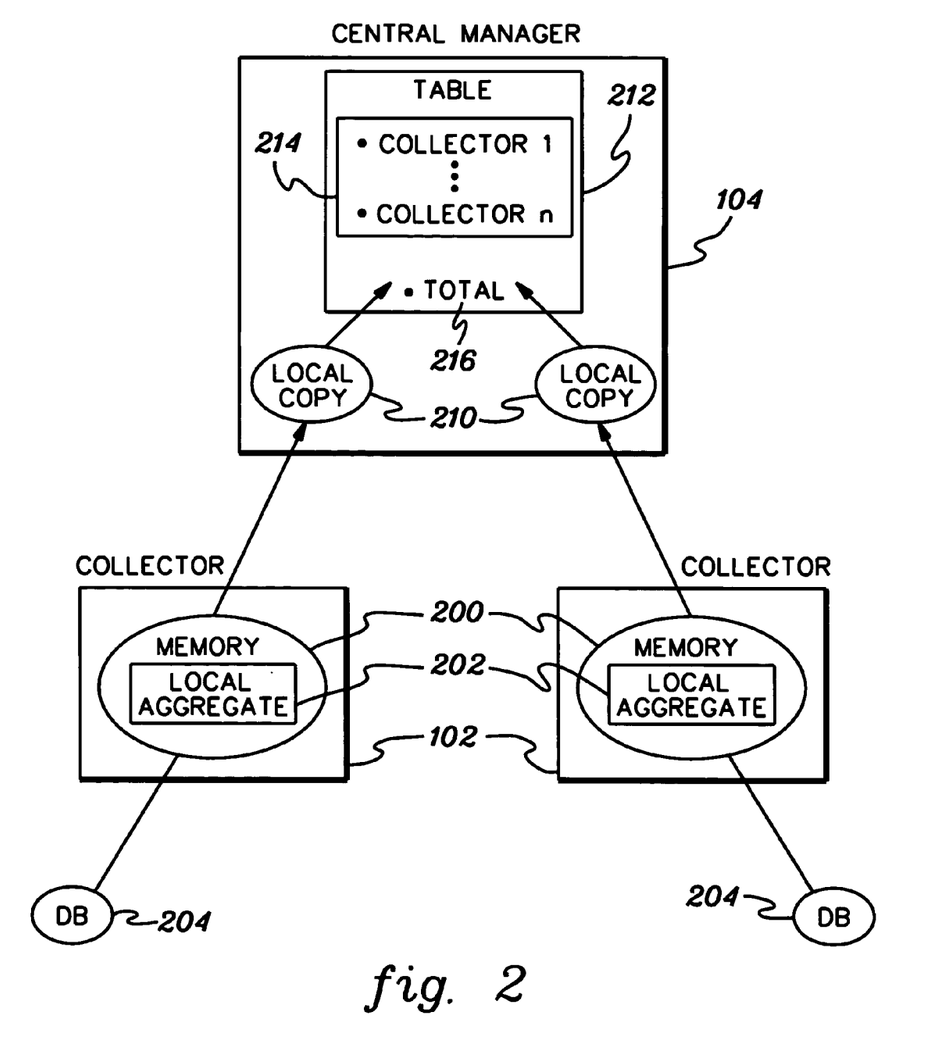
FIG. 2 depicts further details of the processing units of FIG. 1, in accordance with an aspect of the present invention.

Further details regarding the collectors and the central manager are described with reference to FIG. 2. In one embodiment, each collector 102 includes a memory 200 to store a local aggregate 202 of the collected data. This data is unique to the collector collecting it, in that the data is associated with jobs executing on that collector. In one example, the data includes or has associated therewith a timestamp that indicates when the data was last aggregated. Collector 102 also includes or is coupled to a database 204, in which a persistent copy of the locally aggregated data is stored. Database 204 is stored, for instance, on a storage medium, such as disk, coupled to collector 102.

Each collector 102 sends its locally aggregated data to central manager 104, which maintains a local copy 210 of the collector's data. Central manager 104 also includes a data structure, such as table 212, which has a list 214 with an entry for each collector. Each entry in the list stores a local copy of the latest aggregated value received from the corresponding collector, as well as its timestamp. Table 212 also includes a total aggregate value 216, which is an aggregation of all of the local copies from the list.

Figure 3:
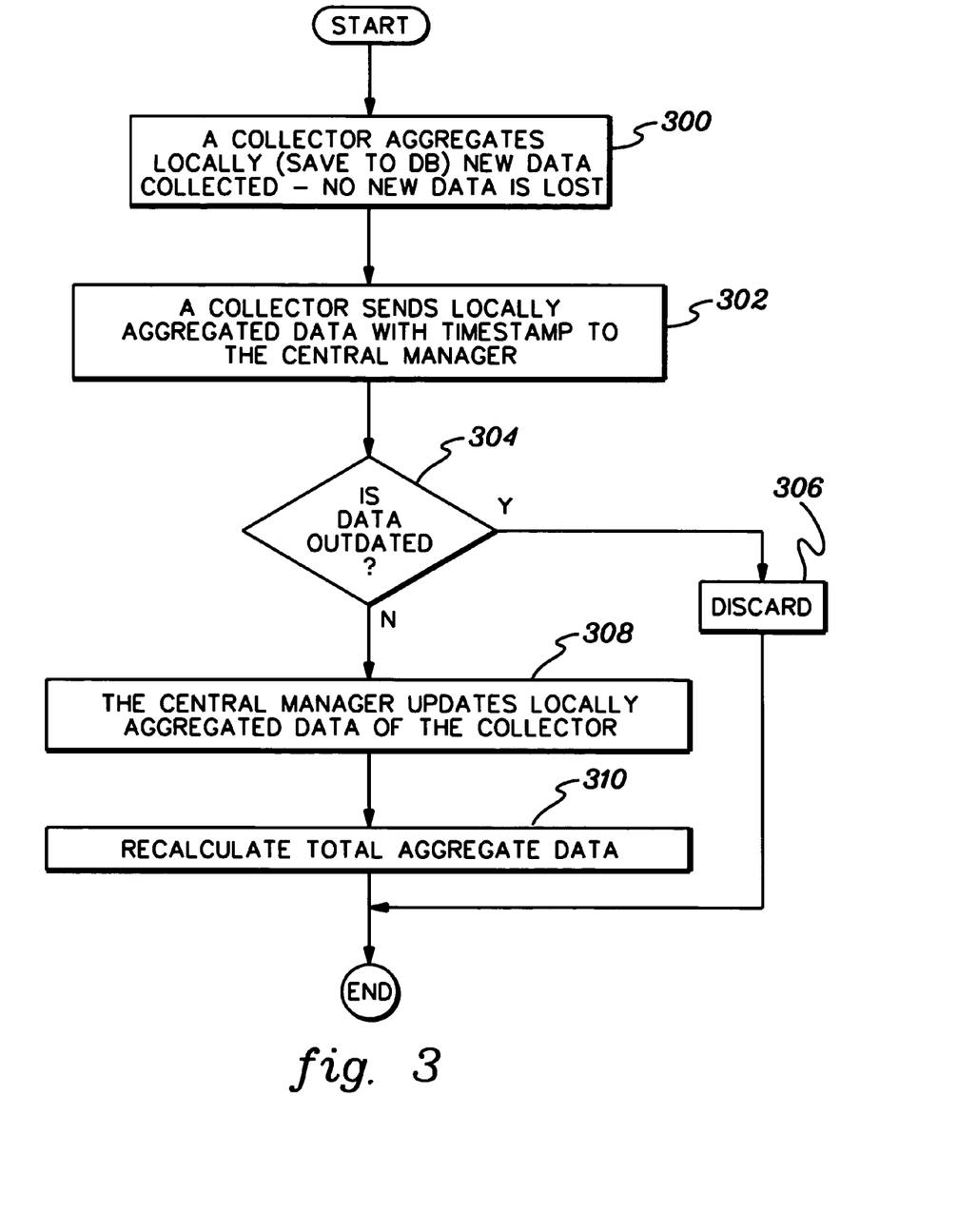
FIG. 3 depicts one embodiment of the logic associated with collecting and aggregating data in a fault tolerant manner, in accordance with an aspect of the present invention.

One embodiment of the logic associated with collecting and aggregating data of multiple collectors is described with reference to FIG. 3. Initially, when a job processing on a collector terminates or at periodic intervals, a collector collects new data associated with that job and locally aggregates that data. For instance, the collector may collect the reported amount of CPU time used by the job and aggregate that time with already collected CPU time. This locally aggregated data is saved in memory of the collector and in a database for persistence. This ensures that no new data is lost.

Thereafter, at periodic intervals (e.g., every 2 minutes) or when a job terminates, as examples, the collector sends its locally aggregated data and a timestamp indicating when the data was aggregated, to the central manger, STEP 302. In one example, this information is sent over a non-reliable communications connection.

When the central manager receives the locally aggregated data from the collector, it determines whether the data is outdated, INQUIRY 304. In one example, this determination is made by comparing the timestamp sent with the data with a timestamp of the data already stored at the central manager for this collector or a default value. If the timestamp on the incoming data is older than the data in the table entry, then the incoming data is discarded, STEP 306. Otherwise, the central manger updates the locally aggregated data of the collector, STEP 308. In one example, the aggregate value in the table associated with the collector sending the data is replaced by the new data. Further, the total aggregated data is updated by replacing the old data in the old total by the new data or by adding the local copies together to get the new total, as examples, STEP 310.

By collecting and aggregating the data in the above manner, out-of-order updates and/or lost data are tolerated. Further, should a restart of a collector and/or central manager be necessary, the data is preserved. This is described in further detail with reference to FIG. 4.

Figure 4:
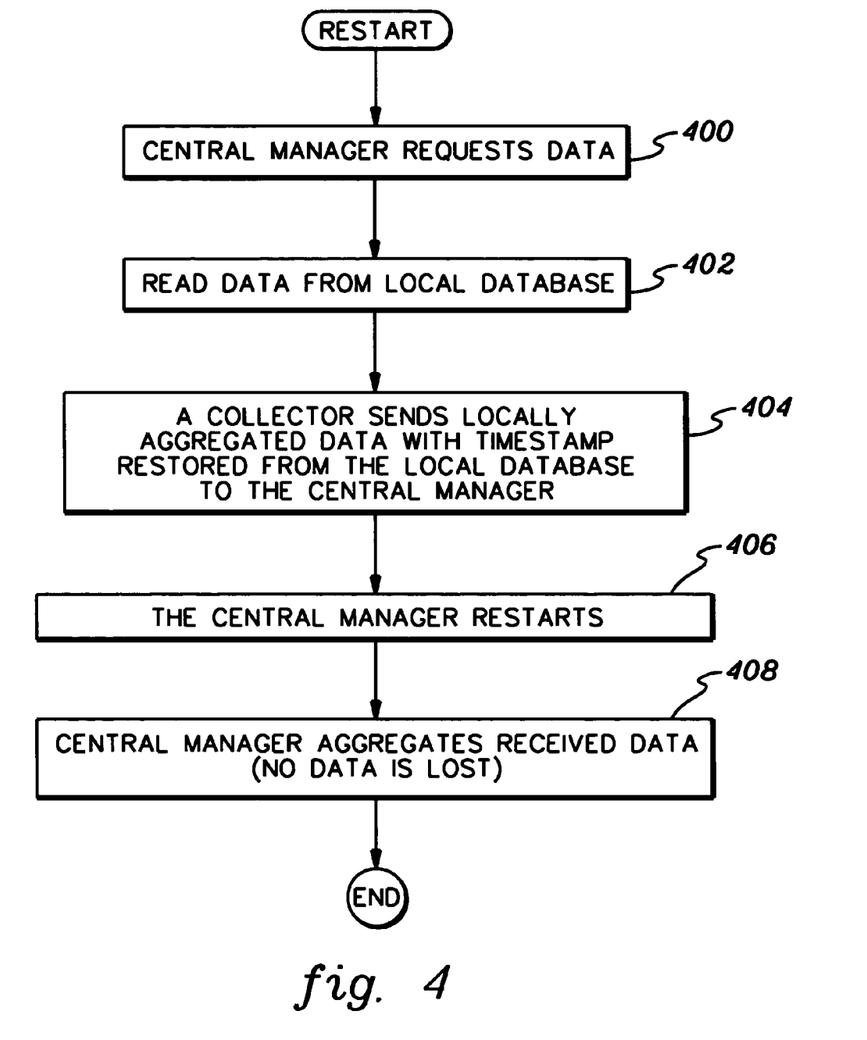
FIG. 4 depicts one embodiment of the logic associated with collecting and aggregating data, in response to a restart within the processing environment, in accordance with an aspect of the present invention.

Upon a restart (or start-up) of a collector, central manager 104 requests the collector to send its locally aggregated data to the central manager, STEP 400. In another embodiment, the collector sends the information without being prompted. The collector reads the data from its local database, STEP 402, and sends the locally aggregated data with its timestamp restored from the local database to the central manager, STEP 404. The data is sent over a communications medium that may be unreliable. Thus, in the situation where the collector retries and sends duplicate updates, the central manager tolerates receiving the same data multiple times, since it simply replaces the data in the appropriate local entry in the list and recomputes the total aggregate value. If the central manager receives out-of-order updates, it ignores/discards any update with a timestamp that is older than the timestamp on the corresponding local entry. Since a later update (that is received by the central manager before the earlier update, from the collector's perspective) already includes the older one, the corresponding local aggregate is valid. In the case where one or more updates from the collector are lost due to an unreliable connection, the next successful update includes all the contributions from the lost updates because the data is persistent on the collector.

If the central manager fails and is restarted, STEP 406, local entries in the table are populated with the data from the requested updates, STEP 408. Since the data is persistent at the collector, no data is lost. In a further embodiment, the local data at the central manager may be maintained in a persistent store and used if the central manager is restarted.

Figure 5:
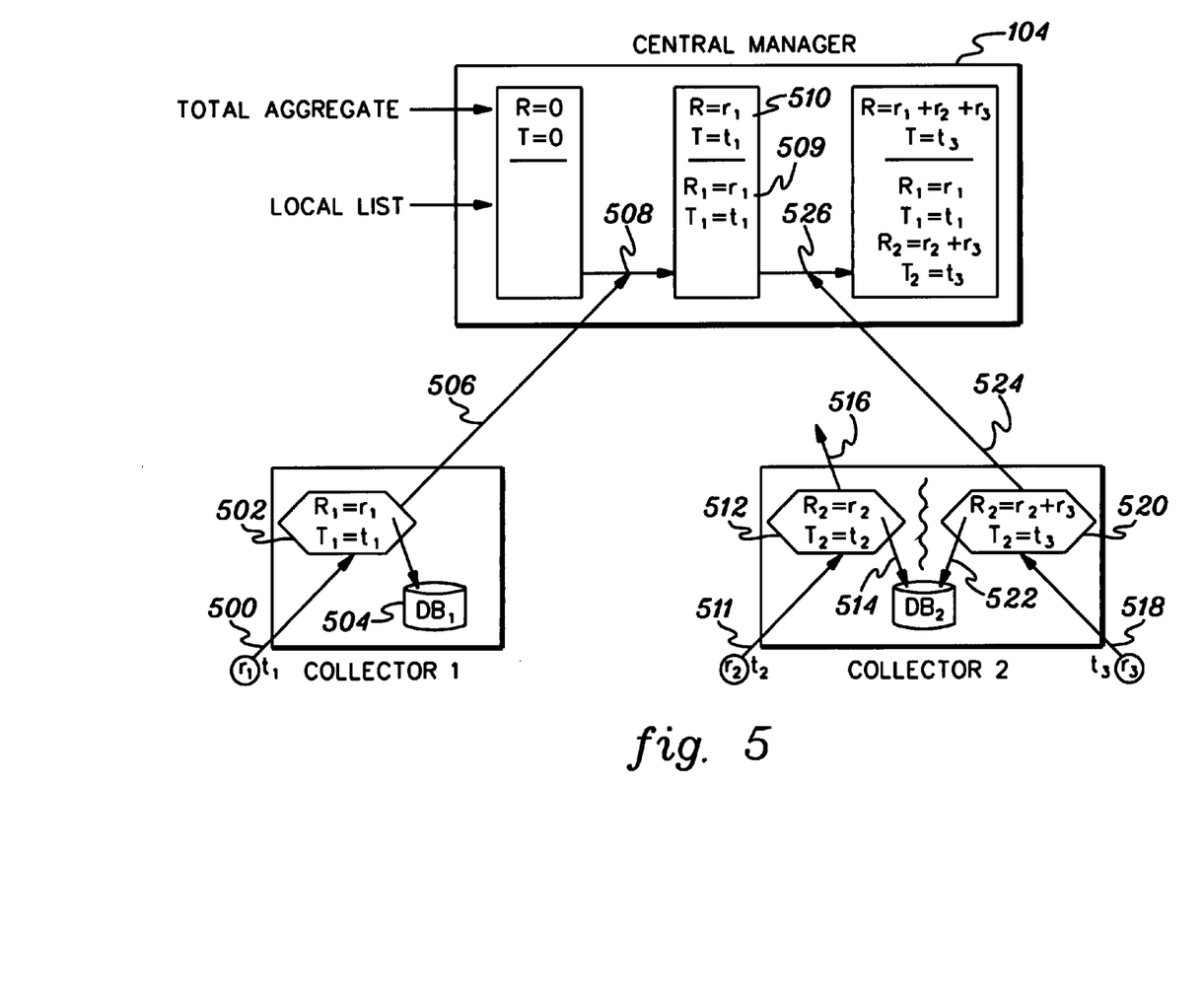
FIG. 5 depicts one particular example of the central manger collecting data, aggregating data and handling lost data, in accordance with an aspect of the present invention.

One particular example of collectors collecting and storing data, and a central manager being updated by the collectors is described with reference to FIG. 5. FIG. 5 also depicts an example of the handling of lost data. In this example, an aggregation operator "+" is used, which given data A and B forms A+B. The "+" operator is known to be associative, such that (A+B)+C is equal to A+(B+C). Further, "+" can be at a time dependent operation. For example, (r1,t1)+(r2,t2)=(r,t2) with r=r1*exp(−k*(t2−t1))+r2, where k is a decay constant.

As a specific example, the data being collected is job resource usage data, e.g., job CPU data, for jobs executing on a set of distributed machines. An aggregate of the data is to be used by a scheduler of a workload management system. Other examples and variations also exist.

Referring to FIG. 5, in STEP 500, Collector 1 receives a piece of new data r1 (e.g., 100 CPU minutes) at time t1 (e.g., time 0—present time). In STEP 502, Collector 1 updates its local aggregate R1 to r1 and T1 to t1 such that R1=100 and T1=0. At STEP 504, Collector 1 updates its local database, $DB_1$, with the new R1/T1 values. In STEP 506, Collector 1 sends its new local aggregate R1=100/T1=0 to central manager 104. The central manager receives the update at STEP 508, and updates the table entry 509 for Collector 1 with R1/T1 and re-computes the total aggregate to R=$r_1$=100, T=$t_1$=0 (510).

In STEP 511, Collector 2 receives a piece of new data r2 (e.g., 200 CPU minutes) at time t2 (e.g., 50 seconds). Collector 2 updates its local aggregate R2 to r2 and T2 to t2 at STEP 512, such that R2=200 and T2=50. In STEP 514, Collector 2 updates the local database, $DB_2$, with the new R2=200/T2=50 values. It then sends its new local aggregate R2/T2 to the central manager, STEP 516, but in this case, the transaction is lost.

In STEP 518, Collector 2 receives a piece of new data r3 (e.g., 120 CPU minutes) at time t3 (e.g., 150 seconds). Collector 2 updates its local aggregate R2 to r2+r3 and T2 to t3, STEP 520. This update beneficially includes the update that was lost at STEP 516. Thus, R2=r2+r3=320, and T2=t3=150. In STEP 522, Collector 2 updates its local database, $DB_2$, with new R2/T2 values. Then, Collector 2 sends its new local aggregate R2=320/T2=150 to the central manager, STEP 524. In STEP 526, central manager 104 updates the table entry for Collector 2 with R2/T2 and re-computes the total aggregate to R=r1+r2+r3=420, T=t3=150.

Described in detail above is a collection and aggregation capability that enables data to be collected and aggregated from multiple processing units in a fault tolerant manner.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of one or more aspects of the present invention. The article of manufacture can be included as a part of a computer system or sold separately.

Figure 6:
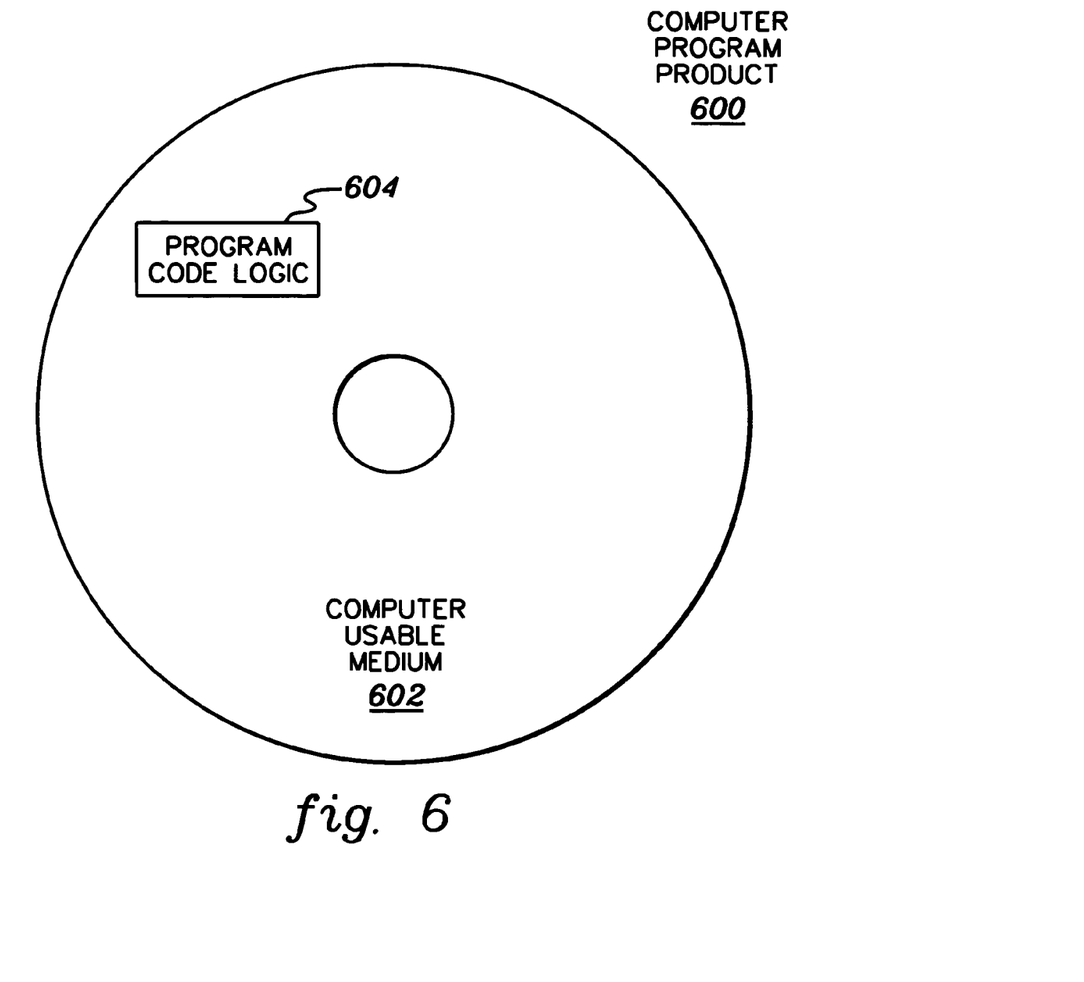
FIG. 6 depicts one example of a computer program product incorporating one or more aspects of the present invention.

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk—read/write (CD-R/W) and DVD.

A sequence of program instructions or a logical assembly of one or more interrelated modules defined by one or more computer readable program code means or logic direct the performance of one or more aspects of the present invention.

One or more aspects of the capability described herein are or can be included in various products, including, but not limited to, workload management products, such as Tivoli Workload Scheduler LOADLEVELER offered by International Business Machines Corporation. (LOADLEVELER is a registered trademark of International Business Machines Corporation, Armonk, N.Y.). Other products, including, but not limited to, other workload management products, can include one or more aspects of the present invention.

Advantageously, one or more aspects of the present invention enable the fault tolerant collection and aggregation of data from multiple processing units. Duplicate data, out-of-order data and lost data are all tolerated. Each collector maintains a database of locally aggregated data, which is persistent in case of failure of the collector. Further, the central manager also maintains a memory copy and optionally, a persistent copy of the locally aggregated data of a collector and uses a timestamp to determine whether received locally aggregated data is to be included in the total aggregated data for the environment.

Although one or more examples have been provided herein, these are only examples. Many variations of these examples can be made without departing from the spirit of the present invention. For instance, processing environments other than the examples provided herein may include and/or benefit from one or more aspects of the present invention. For example, the environment may not be a clustered environment and/or it may include more or less processing units than described herein. Yet further, the environment may include an operating system other than Linux or AIX®. Still further, other networks and/or connections than those described herein may be used. Still further, one or more of the processing units may be different than a PSERIES server. Many other variations exist.

For instance, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

As yet further examples of variations, more than one central manager may be used, and/or data other than resource usage data may be collected and aggregated. Many other variations exist.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method of monitoring processes executing in a multiprocessor system comprising multiple clusters of processors, the method comprising:
    collecting information associated with the processes at local collectors within the multiple clusters to generate locally aggregated data;
    responsive to an event indicating that transmission of the aggregated data object should be performed, time-stamping the locally aggregated data with a timestamp;
    further responsive to the event indicating that transmission of the aggregated data object should be performed, transmitting the aggregated data with the timestamp to a central manager;
    receiving the aggregated data at the central manager;
    responsive to receiving the aggregated data at the central manager, determining whether or not the value of a time stamp indicates that the corresponding aggregated data is outdated or a duplicate of previously-received data; and
    responsive to determining that the value of the time stamp indicates that the corresponding aggregated data is not outdated and not a duplicate of the previously-received data, updating data managed by the central manager for the corresponding local collector with the received aggregated data;
    responsive to determining that the value of the time stamp indicates that the corresponding aggregated data is outdated or is a duplicate of the previously-received data, discarding the received aggregated data;
    accumulating the received aggregated data in one or more data values at the central manager and updated in common from all of the multiple clusters; and
    computing a modified value from the aggregated data using an exponential time-dependent decay function dependent on a difference between the time stamp and a previous time stamp, according to the equation $r=r_1*\exp(-k*(t_2-t_1))+r_2$, where r is the modified value, * is a multiplication operator, exp is an exponential operator, k is a decay constant, $(r_1, t_1)$ is a previous data value/timestamp pair and $(r_2, t_2)$ is a timestamp pair comprising the received aggregated data and the corresponding timestamp.

2. The method of claim 1, wherein the received aggregated data is a measure of resource usage by the processes and wherein the further accumulating generates a resource usage total from among all of the multiple clusters.

3. The method of claim 1, wherein the event is an end of job indication signaling termination of one or more of the processes.

4. A multiprocessor computer system comprising multiple clusters of processors, wherein at least one of the processors executes program instructions stored within at least one memory of the multiprocessor computer system, wherein the program instructions comprise program instructions for monitoring processes executing within the multiprocessor computer system, the program instructions comprising program instructions for:
    collecting information associated with the processes at local collectors within the multiple clusters to generate locally aggregated data;
    responsive to an event indicating that transmission of the aggregated data object should be performed, time-stamping the locally aggregated data with a timestamp;
    further responsive to the event indicating that transmission of the aggregated data object should be performed, transmitting the aggregated data with the timestamp to a central manager;
    receiving the aggregated data at the central manager;
    responsive to receiving the aggregated data at the central manager, determining whether or not the value of a time stamp indicates that the corresponding aggregated data is outdated or a duplicate of previously-received data; and
    responsive to determining that the value of the time stamp indicates that the corresponding aggregated data is not outdated and not a duplicate of the previously-received data, updating data managed by the central manager for the corresponding local collector with the received aggregated data;
    responsive to determining that the value of the time stamp indicates that the corresponding aggregated data is outdated or is a duplicate of the previously-received data, discarding the received aggregated data;
    accumulating the received aggregated data in one or more data values at the central manager and updated in common from all of the multiple clusters; and
    computing a modified value from the aggregated data using an exponential time-dependent decay function dependent on a difference between the time stamp and a previous time stamp, according to the equation $r=r_1*\exp(-k*(t_2-t_1))+r_2$, where r is the modified value, * is a multiplication operator, exp is an exponential operator, k is a decay constant, $(r_1, t_1)$ is a previous data value/timestamp pair and $(r_2, t_2)$ is a timestamp pair comprising the received aggregated data and the corresponding timestamp.

5. The multiprocessor computer system of claim 4, wherein the received aggregated data is a measure of resource usage by the processes and wherein the program instructions for accumulating generate a resource usage total from among all of the multiple clusters.

6. The multiprocessor computer system of claim 4, wherein the event is an end of job indication signaling termination of one or more of the processes.

7. A computer program product comprising a computer-readable storage medium, storing program instructions execution within a multiprocessing system, for monitoring processes executing within the multiprocessor computer system, the program instructions comprising program instructions for:

receiving aggregated data from a plurality of clusters of processors within the multiprocessor computer system at a central manager, wherein the data comprises collected information associated with the processes and bearing timestamps;

responsive to receiving the aggregated data at the central manager, determining whether or not the value of a time stamp indicates that the corresponding aggregated data is outdated or a duplicate of previously-received data; and responsive to determining that the value of the time stamp indicates that the corresponding aggregated data is not outdated and not a duplicate of the previously-received data, updating data managed by the central manager for the corresponding local collector with the received aggregated data;

responsive to determining that the value of the time stamp indicates that the corresponding aggregated data is outdated or is a duplicate of the previously-received data, discarding the received aggregated data;

accumulating the received aggregated data in one or more data values at the central manager and updated in common from all of the multiple clusters; and computing a modified value from the aggregated data using an exponential time-dependent decay function dependent on a difference between the time stamp and a previous time stamp, according to the equation $r=r_1*exp(-k*(t_2-t_1))+r_2$, where r is the modified value, * is a multiplication operator exp is an exponential operator, k is a decay constant, $r_1$, $t_1$) is a previous data value/timestamp pair and ($r_2$, $t_2$) is a timestamp pair comprising the received aggregated data and the corresponding timestamp.

8. The computer program product of claim 7, wherein the received aggregated data is a measure of resource usage by the processes and wherein the program instructions for accumulating generate a resource usage total from among all of the multiple clusters.

9. The computer program product of claim 7, wherein the event is an end of job indication signaling termination of one or more of the processes.

* * * * *